(12) United States Patent
Adragna

(10) Patent No.: US 12,627,237 B2
(45) Date of Patent: May 12, 2026

(54) BOOTSTRAP RECHARGE SYSTEM IN DUAL-SWITCH FLYBACK CONVERTERS

(71) Applicant: STMicroelectronics International N.V., Geneva (CH)

(72) Inventor: Claudio Adragna, Monza (IT)

(73) Assignee: STMicroelectronics International N.V., Geneva (CH)

( * ) Notice: Subject to any disclaimer, the term of this patent is extended or adjusted under 35 U.S.C. 154(b) by 263 days.

(21) Appl. No.: 18/386,949

(22) Filed: Nov. 3, 2023

(65) Prior Publication Data

US 2025/0149993 A1 May 8, 2025

(51) Int. Cl.
*H02M 3/335* (2006.01)
*H02M 1/00* (2006.01)
*H02M 1/08* (2006.01)

(52) U.S. Cl.
CPC ..... *H02M 3/33571* (2021.05); *H02M 1/0006* (2021.05); *H02M 1/08* (2013.01)

(58) Field of Classification Search
CPC ........... H02M 3/33571; H02M 1/0006; H02M 1/08; H02M 3/158
See application file for complete search history.

(56) References Cited

U.S. PATENT DOCUMENTS

| | | | | |
|---|---|---|---|---|
| 7,550,959 | B2 * | 6/2009 | Tateno ................ | H02M 3/1588 |
| | | | | 323/314 |
| 10,033,260 | B2 * | 7/2018 | Chin .......................... | G05F 1/62 |
| 10,439,503 | B1 * | 10/2019 | Kaya ....................... | H02M 1/08 |
| 12,015,349 | B2 * | 6/2024 | Fukushima ......... | H02M 3/1584 |
| 2007/0159150 | A1 * | 7/2007 | Hosokawa ........... | H03K 17/687 |
| | | | | 323/285 |
| 2017/0054369 | A1 | 2/2017 | Chin et al. | |
| 2020/0350825 | A1 | 11/2020 | Tzeng | |
| 2022/0006450 | A1 | 1/2022 | Fontana et al. | |

FOREIGN PATENT DOCUMENTS

CN            113541453 A      10/2021

* cited by examiner

*Primary Examiner* — Kyle J Moody
(74) *Attorney, Agent, or Firm* — Slater Matsil, LLP

(57) ABSTRACT

According to an embodiment, a converter includes a bootstrap capacitor, a high-side switch, a low-side switch, an auxiliary switch, and a controller. The bootstrap capacitor has a first terminal coupled to a floating ground node. The high-side switch has a source terminal coupled to the bootstrap capacitor through the floating ground node. The auxiliary switch has a drain terminal coupled to the bootstrap capacitor through the floating ground node. The controller provides a first control signal to a control terminal of the high-side switch, provides a second control signal to a control terminal of the low-side switch, and provides a third control signal to a control terminal of the auxiliary switch. The third control signal is based on a condition associated with the converter after the first control signal and the second control signal deactivate the high-side switch and the low-side switch respectively.

20 Claims, 8 Drawing Sheets

BOOTSTRAP RECHARGE SYSTEM IN DUAL-SWITCH FLYBACK CONVERTERS

TECHNICAL FIELD

The present disclosure generally relates to electric circuits and, in particular embodiments, to a bootstrap recharge system in dual-switch flyback converters.

BACKGROUND

The dual-switch flyback converter is a design topology used in power electronics. However, just like any other electronic system, it grapples with specific technical challenges that need addressing for optimal performance. One of the prominent issues at the forefront is ensuring that the bootstrap capacitor maintains an adequate charge under all operating conditions, particularly to drive the high-side switch of the converter.

To initiate the charge of the bootstrap capacitor, the low-side switch can be turned ON for a specific duration— an approach mirroring techniques used in half-bridge structures. By activating low-side switch, the potential at the floating ground (FGND) node is essentially zero. Facilitating the charging of the bootstrap capacitor through the low-side switch and the primary winding of the converter's transformer.

As the converter operates and switches, the recharging of the bootstrap capacitor comes into play. The presence of substantial energy from the leakage inductance of the transformer can draw the potential at the floating ground (FGND) close to zero resulting in the recharging of the bootstrap capacitor. This is further amplified when the recirculation diodes of the converter are activated during the OFF states of the high-side and low-side switches. The voltage shift across the primary winding, upon the deactivation of high-side and low-side switches, is equivalent to the sum of the reflected voltage ($V_R$) and the voltage spike due to leakage inductance ($V_x$). However, a potential challenge arises if the combined value of the reflected voltage ($V_R$) and the voltage spike due to leakage inductance ($V_x$) falls short of the input voltage ($V_{IN}$). Under such circumstances, the potential at the floating ground (FGND) node doesn't reach zero.

The integrity of the converter's operation hinges on the adequate recharging of bootstrap capacitor. When the energy from the leakage inductance is insufficient to drive the potential at the floating ground (FGND) node close to zero, the bootstrap capacitor cannot recharge. Over time, this culminates in an inability to activate the high-side switch, derailing the operation of the converter.

SUMMARY

Technical advantages are generally achieved by embodiments of this disclosure, which describe a bootstrap recharge system in dual-switch flyback converters.

A first aspect relates to a converter that includes a bootstrap capacitor, a high-side switch, a low-side switch, an auxiliary switch, and a controller. The bootstrap capacitor has a first terminal coupled to a floating ground node. The high-side switch has a source terminal coupled to the bootstrap capacitor through the floating ground node. The auxiliary switch has a drain terminal coupled to the bootstrap capacitor through the floating ground node. The controller is configured to provide a first control signal to a control terminal of the high-side switch, provide a second control signal to a control terminal of the low-side switch, and provide a third control signal to a control terminal of the auxiliary switch. The third control signal to activate the auxiliary switch for a current cycle is based on a condition associated with the converter after the first control signal and the second control signal deactivate the high-side switch and the low-side switch respectively.

A second aspect relates to a method of operating a converter. The method includes generating, by a controller, a first control signal to a control terminal of a high-side switch of the converter, the high-side switch having a source terminal coupled to a bootstrap capacitor through a floating ground node; generating, by the controller, a second control signal to a control terminal of a low-side switch of the converter; and determining, by the controller, whether to activate an auxiliary switch for a current cycle using a third control signal, the auxiliary switch having a drain terminal coupled to the bootstrap capacitor through the floating ground node. The determining is based on a condition associated with the converter after the first control signal and the second control signal deactivate the high-side switch and the low-side switch respectively.

A third aspect relates to a device with a converter. The converter includes a bootstrap capacitor, a high-side switch, a low-side switch, an auxiliary switch, and a controller. The bootstrap capacitor has a first terminal coupled to a floating ground node. The high-side switch has a source terminal coupled to the bootstrap capacitor through the floating ground node. The auxiliary switch has a drain terminal coupled to the bootstrap capacitor through the floating ground node. The controller is configured to provide a first control signal to a control terminal of the high-side switch, provide a second control signal to a control terminal of the low-side switch, and provide a third control signal to a control terminal of the auxiliary switch. The third control signal to activate the auxiliary switch for a current cycle is based on a condition associated with the converter after the first control signal and the second control signal deactivate the high-side switch and the low-side switch respectively.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of dual-switch flyback converters, it should also be appreciated that these inventive aspects may also apply to other types of power converters.

Figure 1:
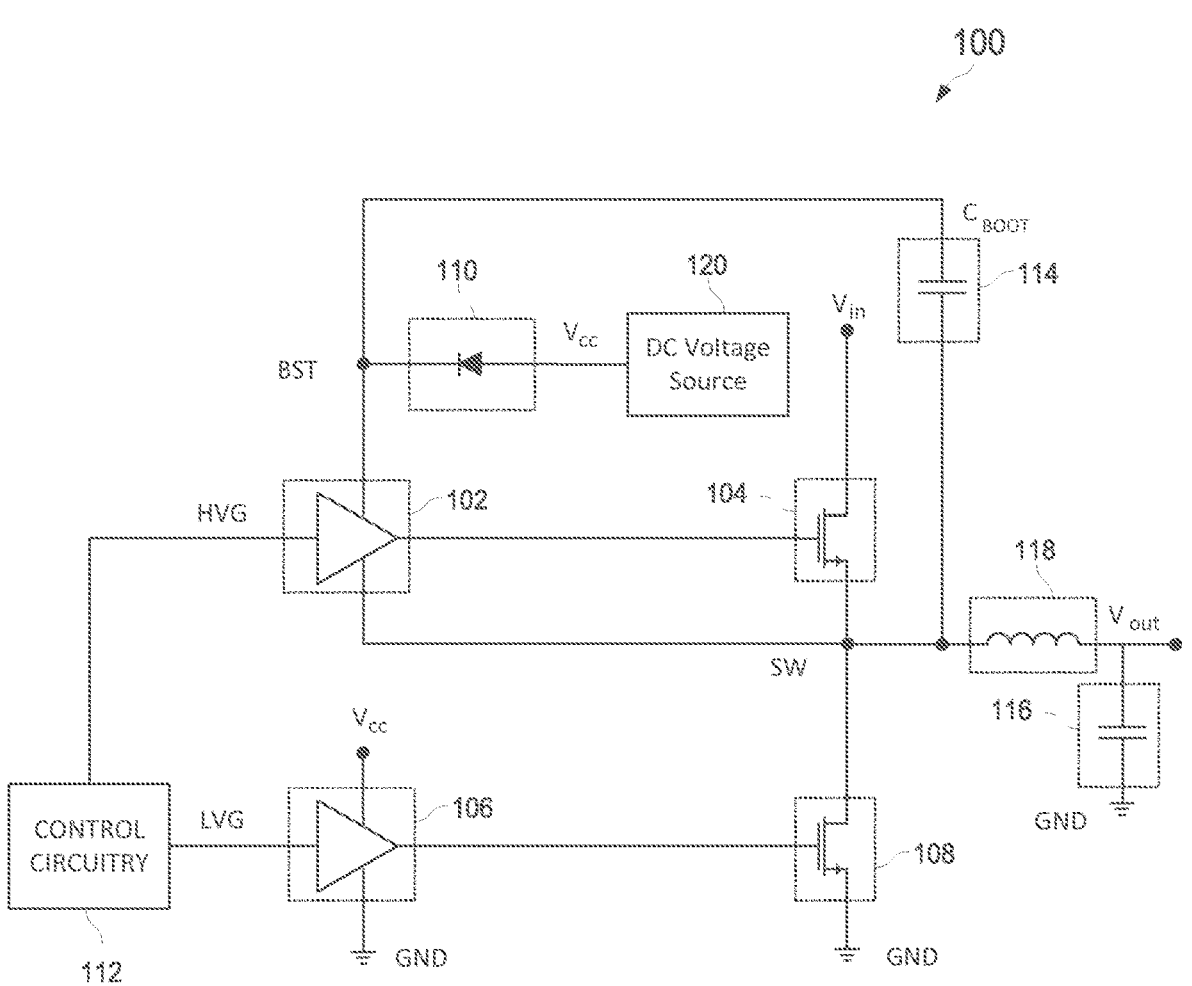
FIG. 1 is a schematic of a conventional DC-DC converter.

FIG. 1 illustrates a schematic of a conventional DC-DC converter 100. The DC-DC converter 100 includes high-side drive circuitry 102, a high-side transistor 104, low-side drive circuitry 106, a low-side transistor 108, a bootstrap diode 110, a bootstrap capacitor ($C_{BOOT}$) 114, an output capacitor 116, an inductor 118, and a DC voltage source 120.

In the DC-DC converter 100, the control circuitry 112 alternately drives the high-side transistor 104 and the low-side transistor 108 ON and OFF, respectively, via the high-side signal (HVG) and the low-side signal (LVG) to create a desired output voltage ($V_{out}$). The DC voltage source 120 is configured to generate a regulated voltage ($V_{cc}$), provided to the bootstrap diode 110 and the low-side drive circuitry 106. In embodiments, the regulated voltage (Vcc) is generated by the DC voltage source 120 using an auxiliary winding (not shown) coupled to the transformer, a rectification diode (not shown), and a buffer capacitor (not shown) to obtain a substantially DC voltage.

The output capacitor 116 and inductor 118 form an LC circuit at the output of the DC-DC converter 100 to produce the desired DC output voltage.

The bootstrap diode 110 and the bootstrap capacitor ($C_{BOOT}$) 114 form a bootstrap circuit to generate a boosted voltage (i.e., greater or equal to the minimum gate-source voltage ($V_{gs}$) of the high-side transistor 104) and efficiently drive the high-side transistor 104 by the high-side drive circuitry 102.

Generally, the low-side transistor 108 is directly controlled using control circuitry 112 coupled to the input of the low-side drive circuitry 106. However, directly controlling the high-side transistor 104 by control circuitry 112 becomes more challenging because the source terminal of the high-side transistor ($Q_1$) 104, when the high-side transistor 104 is implemented, for example, as an n-channel Metal-Oxide-Semiconductor Field-Effect Transistor (MOSFET) in a buck converter, is not connected to a ground reference.

During the ON state of the low-side transistor 108 (i.e., OFF phase of the converter), the switching node (SW) is connected to ground. The bootstrap capacitor ($C_{BOOT}$) 114 is charged to a voltage equal to the difference between the regulated voltage ($V_{cc}$) and the threshold voltage of the bootstrap diode 110 as current flows through the bootstrap diode 110 from the regulated voltage ($V_{cc}$). The bootstrap diode 110 is forward-biased and will charge the bootstrap capacitor ($C_{BOOT}$) 114 to a voltage slightly below the regulated voltage ($V_{cc}$).

During the ON state of the high-side transistor 104 (i.e., the ON phase of the converter), the gate voltage of the high-side transistor 104 must be raised above the source voltage level by at least a threshold voltage to ensure it turns entirely ON. However, since the source of the high-side transistor 104 is not connected to the ground reference, it is challenging to drive it directly from the control circuitry 112.

The bootstrap circuit comes into play during this ON state of the high-side transistor 104. The control circuitry 112 asserts the high-side signal (HVG), which allows the voltage stored in the charged bootstrap capacitor ($C_{BOOT}$) 114 to be applied to the control terminal of the high-side transistor 104 through the high-side drive circuitry 102. Applying the voltage from the bootstrap capacitor ($C_{BOOT}$) 114 to the control terminal of the high-side transistor 104 makes the gate-source voltage ($V_{gs}$) sufficient to turn ON the high-side transistor 104.

Once the high-side transistor 104 is ON, the voltage ($V_{FGND}$) at the floating ground (FGND) node is connected to the input power supply ($V_{in}$). The cathode of the bootstrap diode 110 (bootstrap power supply) is equal to the sum of the input power supply ($V_{in}$) and the charge stored across the bootstrap capacitor ($C_{BOOT}$) 114. The bootstrap diode is reverse-biased, and the bootstrap capacitor is disconnected from the regulated voltage ($V_{cc}$). The cycle is continuously repeated as the high-side transistor 104 turns OFF, and the bootstrap capacitor ($C_{BOOT}$) 114 gets recharged during the ON state of the low-side transistor 108.

Figure 2:
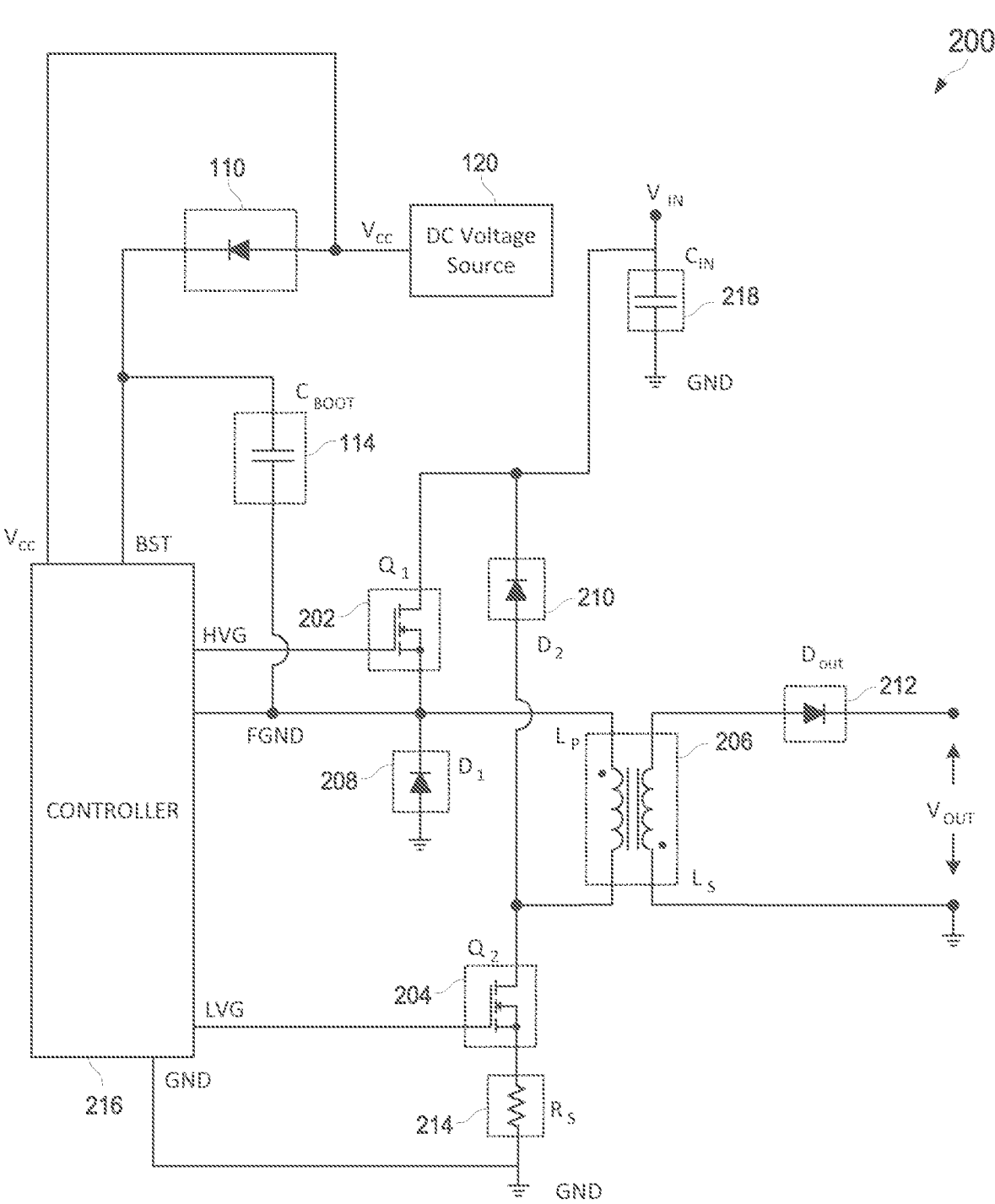
FIG. 2 is a schematic of a conventional dual-switch flyback converter.

FIG. 2 illustrates a schematic of a conventional dual-switch flyback converter 200. Dual-switch flyback converter 200 includes a high-side switch ($Q_1$) 202, a low-side switch ($Q_2$) 204, an transformer 206, a first diode ($D_1$) 208, a second diode ($D_2$) 210, an output diode ($D_{OUT}$) 212, a sense resistor ($R_S$) 214, a control circuitry 216, an input capacitor ($C_{IN}$) 218, the bootstrap diode 110, the bootstrap capacitor ($C_{BOOT}$) 114, and the DC voltage source 120. As shown, the regulated voltage ($V_{cc}$) generated by the DC voltage source 120 is provided to controller circuitry 216.

Each of the high-side switch ($Q_1$) 202 and the low-side switch ($Q_2$) 204 is typically an n-channel Metal-Oxide-Semiconductor Field-Effect Transistor (MOSFET). Transformer 206, with a primary side ($L_P$) and a secondary side ($L_S$), facilitates energy transfer via magnetic coupling from the input to the output. The source terminal of the high-side switch ($Q_1$) 202 is coupled to the secondary side ($L_S$) of the transformer 206 at the floating ground (FGND) node. The drain terminal of the low-side switch ($Q_2$) 204 is coupled to the first terminal of the primary side ($L_P$) of transformer 206.

The high-side switch ($Q_1$) 202 and the low-side switch ($Q_2$) 204 are the principal switches in the dual-switch flyback converter 200. Their synchronous operation-turning on and off simultaneously-manages the current flow in the primary side ($L_P$) of the transformer 206.

The first diode ($D_1$) 208 and the second diode ($D_2$) 210 act as recirculation diodes, channeling energy from the leakage inductance of the transformer 206 back to the input capacitor ($C_{IN}$) 218. This efficient energy utilization, especially in cases with significant transformer leakage, bolsters the overall efficiency of the dual-switch flyback converter 200. The input capacitor ($C_{IN}$) 218 filters and stabilizes the input voltage ($V_{IN}$). The output diode ($D_{OUT}$) 212 functions as an output rectification diode to ensure that current only flows to the output when the high-side switch ($Q_1$) 202 and the low-side switch ($Q_2$) 204 are in the OFF state.

The sense resistor ($R_S$) 214 is coupled to the drain terminal of the low-side switch ($Q_2$) 204 and is used to ensure the safe operation of the dual-switch flyback converter 200 and is typically used for current mode control. When the low-side switch ($Q_2$) 204 is activated, the current flowing through it also traverses the sense resistor ($R_S$) 214. This results in a voltage drop across the sense resistor ($R_S$) 214, directly proportional to the current passing through the low-side switch ($Q_2$) 204. By monitoring this voltage, the control circuitry 216 can precisely gauge the magnitude of the inductor current in real time. This sensed voltage, combined with the feedback signal from the secondary side, allows the control circuitry 216 to modulate the on-time of the high-side switch ($Q_1$) 202 and the low-side switch ($Q_2$) 204, ensuring that the peak primary current is the one exactly required to provide the power demanded by the load while keeping the output voltage regulated at the desired value. As a result, current mode control, facilitated by the sense resistor ($R_S$) 214, enhances the performance of the dual-switch flyback converter 200 by providing rapid response to load and line changes, improving transient behavior, and ensuring safer operation by preventing potential overcurrent scenarios.

The control circuitry 216 includes an input terminal coupled to the output of the bootstrap diode 110 and is configured to drive the high-side switch ($Q_1$) 202 using a high-side gate control signal (HVG). The high-side switch ($Q_1$) 202 operation is based on the same principles used to drive the high-side transistor 104 of the DC-DC converter 100 using the bootstrap diode 110 and the bootstrap capacitor ($C_{BOOT}$) 114. The control circuitry 216 is configured to drive the low-side switch ($Q_2$) 204 using a low-side gate control signal (LVG).

Operationally, when the high-side switch ($Q_1$) 202 and the low-side switch ($Q_2$) 204 are in the active state (i.e., ON state), energy accumulates in the windings of the primary side ($L_P$) of the transformer 206. At this juncture, output diode ($D_{OUT}$) 212 remains inactive, preventing any energy transfer to the output side. The operation shifts when the high-side switch ($Q_1$) 202 and the low-side switch ($Q_2$) 204 are deactivated (i.e., OFF state). The energy stored in the windings of the primary side ($L_P$) of transformer 206 moves to the secondary side ($L_S$) of transformer 206, activating the output diode ($D_{OUT}$) 212 and driving energy to the output.

Due to the non-ideal characteristics of transformer 206, leakage inductance arises because not all the magnetic field produced by the primary winding ($L_P$) is coupled with the secondary winding ($L_S$) of transformer 206. Instead, some of this field is "leaked" outside, which can be schematized by an uncoupled inductance that is in series with the winding of the primary side ($L_P$). Leakage inductance can pose challenges in the operation of the flyback converter, especially during the switch-off phase.

The dual-switch flyback converter 200 is a modification of the standard flyback converter. In a standard flyback converter with a single switch, when the switch turns off, the energy stored in the leakage inductance has nowhere to go, leading to voltage spikes. These spikes can exceed the rated voltage of the components, potentially damaging them. To address this, a resistor, often termed a "snubber resistor" in a resistor-diode-capacitor (RDC) clamp circuit provides a safe path for the energy stored in the leakage inductance to dissipate, thereby protecting the circuit components from potentially harmful voltage spikes. By connecting the RDC clamp across the windings of the primary side ($L_P$), the energy stored in the leakage inductance can be "burned off" or dissipated as heat in the snubber resistor when the switch is turned off.

However, while this method effectively clamps voltage spikes and protects the circuit, it's not the most efficient solution because the energy in the leakage inductance is not reused but simply wasted as heat. This leads to an increase in the thermal load and decreases the overall efficiency of the standard flyback converter.

In the dual-switch flyback converter 200, instead of using the resistor-diode-capacitor (RDC) clamp circuit to dissipate the extra energy as heat, the extra energy during the deactivated state of the high-side switch ($Q_1$) 202 and the low-side switch ($Q_2$) 204 is stored in the input capacitor ($C_{IN}$) 218. During the OFF state of the high-side switch ($Q_1$) 202 and the low-side switch ($Q_2$) 204, the extra voltage across the leakage inductance typically exceeds the input voltage ($V_{IN}$), such that the first diode ($D_1$) 208 and the second diode ($D_2$) 210 become forward biased. This results in the energy stored in the leakage inductance being transferred to the input capacitor ($C_{IN}$) 218. The charging and discharging of the input capacitor ($C_{IN}$) 218 during the different cycles of the dual-switch flyback converter 200 improve efficiency by avoiding the wastage as heat in the standard flyback converter with a single switch.

Further, with the voltage swing across the high-side switch ($Q_1$) 202 and the low-side switch ($Q_2$) 204 effectively split in half compared to single-switch flyback converter designs, capacitive switching losses (i.e., equal to $CV^2$) are minimized in a dual-switch flyback converter 200.

As discussed above, the voltage shift across the windings of the primary side ($L_P$), upon the deactivation of the high-side switch ($Q_1$) 202 and the low-side switch ($Q_2$) 204, is equivalent to the sum of the reflected voltage ($V_R$) and the voltage spike due to leakage inductance ($V_x$). Thus, the voltage ($V_{FGND}$) at the floating ground (FGND) node fails to reach zero if the combined value falls short of the input voltage ($V_{IN}$). When the energy from the leakage inductance is insufficient to drive the voltage ($V_{FGND}$) at the floating ground (FGND) node close to zero, the bootstrap capacitor ($C_{BOOT}$) 114 cannot recharge. Over a few cycles, this results in an inability to activate the high-side switch ($Q_1$) 202, disrupting the operation of the dual-switch flyback converter 200.

Figures 3, 4:
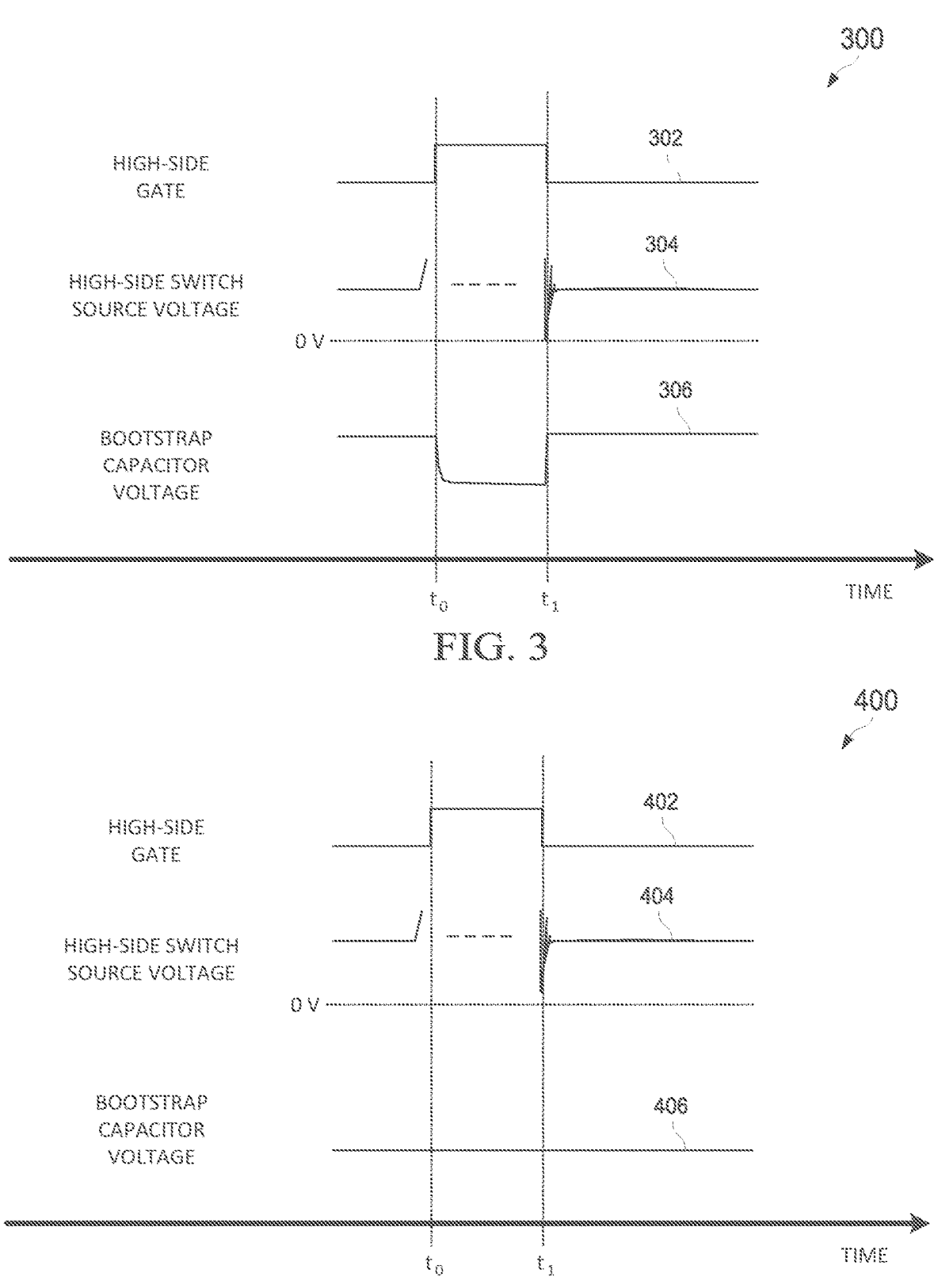
FIG. 3 is a set of waveforms corresponding to an example operation of the dual-switch flyback converter where the bootstrap capacitor ($C_{BOOT}$) is recharged.
FIG. 4 is a set of waveforms corresponding to an example operation of the dual-switch flyback converter where the bootstrap capacitor ($C_{BOOT}$) is not recharged.

FIG. 3 illustrates a set of waveforms 300 corresponding to an example operation of the dual-switch flyback converter 200 where the bootstrap capacitor ($C_{BOOT}$) 114 is recharged. Waveforms 300 include the high-side gating signal 302, the source voltage 304 of the high-side switch ($Q_1$) 202, and the charge voltage 306 at the bootstrap capacitor ($C_{BOOT}$) 114.

The high-side gating signal 302 drives the high-side switch ($Q_1$) 202. In embodiments, the high-side gating signal 302 is at a logic level high when the high-side switch ($Q_1$) 202 is in the ON state and at a logic level low when the high-side switch ($Q_1$) 202 is in the OFF state.

At time $t_0$, the high-side gating signal 302 transitions from a logic level low to a logic level high. Accordingly, the high-side switch ($Q_1$) 202 is activated (it is worth reminding that, simultaneously, the low-side switch Q2 is turned on too). The charge voltage 306 at the bootstrap capacitor ($C_{BOOT}$) 114 drops in value at time $t_0$. The bootstrap capacitor ($C_{BOOT}$) 114 is slightly discharged to drive the high-side switch ($Q_1$) 202 because of the electric charge that is transferred from the bootstrap capacitor ($C_{BOOT}$) 114 to the gate capacitance of the high-side switch ($Q_1$) 202.

At time $t_1$, the high-side gating signal 302 transitions from a logic level high to a logic level low. Accordingly, the high-side switch ($Q_1$) 202 is deactivated. The charge voltage 306 at the bootstrap capacitor ($C_{BOOT}$) 114 increases in value at time $t_1$. This is because when the high-side switch ($Q_1$) 202 is turned OFF, there is sufficient energy for the voltage ($V_{FGND}$) at the floating ground (FGND) node to go to zero for the bootstrap capacitor ($C_{BOOT}$) 114 to recharge.

FIG. 4 illustrates a set of waveforms 400 corresponding to an example operation of the dual-switch flyback converter 200 where the bootstrap capacitor ($C_{BOOT}$) 114 is not recharged. Waveforms 400 include the high-side gating signal 402, the source voltage 404 of the high-side switch ($Q_1$) 202, and the charge voltage 406 at the bootstrap capacitor ($C_{BOOT}$) 114.

The high-side gating signal 402 drives the high-side switch ($Q_1$) 202. In embodiments, the high-side gating signal 402 is at a logic level high when the high-side switch ($Q_1$) 202 is in the ON state and at a logic level low when the high-side switch ($Q_1$) 202 is in the OFF state.

At time $t_0$, the high-side gating signal 402 transitions from a logic level low to a logic level high. Accordingly, the high-side switch ($Q_1$) 202 is activated. Again, the bootstrap capacitor ($C_{BOOT}$) 114 is slightly discharged to drive the high-side switch ($Q_1$) 202 because of the electric charge that is transferred from the bootstrap capacitor ($C_{BOOT}$) 114 to the gate capacitance of the high-side switch ($Q_1$) 202.

At time $t_1$, the high-side gating signal 302 transitions from a logic level high to a logic level low. Accordingly, the high-side switch ($Q_1$) 202 is deactivated. In contrast to the charge voltage 306 at the bootstrap capacitor ($C_{BOOT}$) 114, the charge voltage 406 at the bootstrap capacitor ($C_{BOOT}$) 114 does not increase. This is because the source voltage 404 of the high-side switch ($Q_1$) 202, unlike the source voltage 304 of the high-side switch ($Q_1$) 202, does not reach zero. Accordingly, the bootstrap capacitor ($C_{BOOT}$) 114 will be discharged cycle after cycle until it fails to provide sufficient voltage at time $t_0$, and the high-side switch ($Q_1$) 202 cannot turn ON.

Conventional solutions to address this problem include (i) the use of an auxiliary transformer winding and (ii) the use of a drive transformer instead of the bootstrap topology. In the first case, the bootstrap capacitor ($C_{BOOT}$) 114 is still used, but an auxiliary winding is coupled to the windings of the primary side ($L_P$). When the low-side switch ($Q_2$) 204 is turned ON, the voltage across the auxiliary winding is positive, which allows the recharging of the bootstrap capacitor ($C_{BOOT}$) 114 through the auxiliary winding. While the auxiliary winding technique offers some benefits, it presents multiple challenges. On the upside, the absence of a drive transformer can potentially simplify the design. However, the first approach results in higher power dissipation, which can lead to inefficiencies in the system. Additionally, the first conventional solution exhibits poor standby performance. The complexity of the transformer in this setup is higher, which can complicate the design process and potentially affect reliability. Lastly, this design finds it challenging to manage a wide range for the output voltage ($V_{OUT}$), which could restrict its application in meeting modern power requirements, such as those of universal serial bus (USB) power delivery (PD).

In the second solution, a drive transformer is used with a standard flyback controller, where a winding is connected to its gate-drive output, and windings are added to the gate side of each of the high-side and low-side switches, plus a handful of passive components needed for proper operation. On the positive side, this method boasts low power dissipation, making the system more energy-efficient. The standby performance of this setup is also improved compared to the first solution, ensuring that the system remains reliable even in idle or low-load conditions. However, adding a drive transformer, while offering these advantages, also means increasing the number of components, potentially complicating assembly and maintenance.

Figure 5:
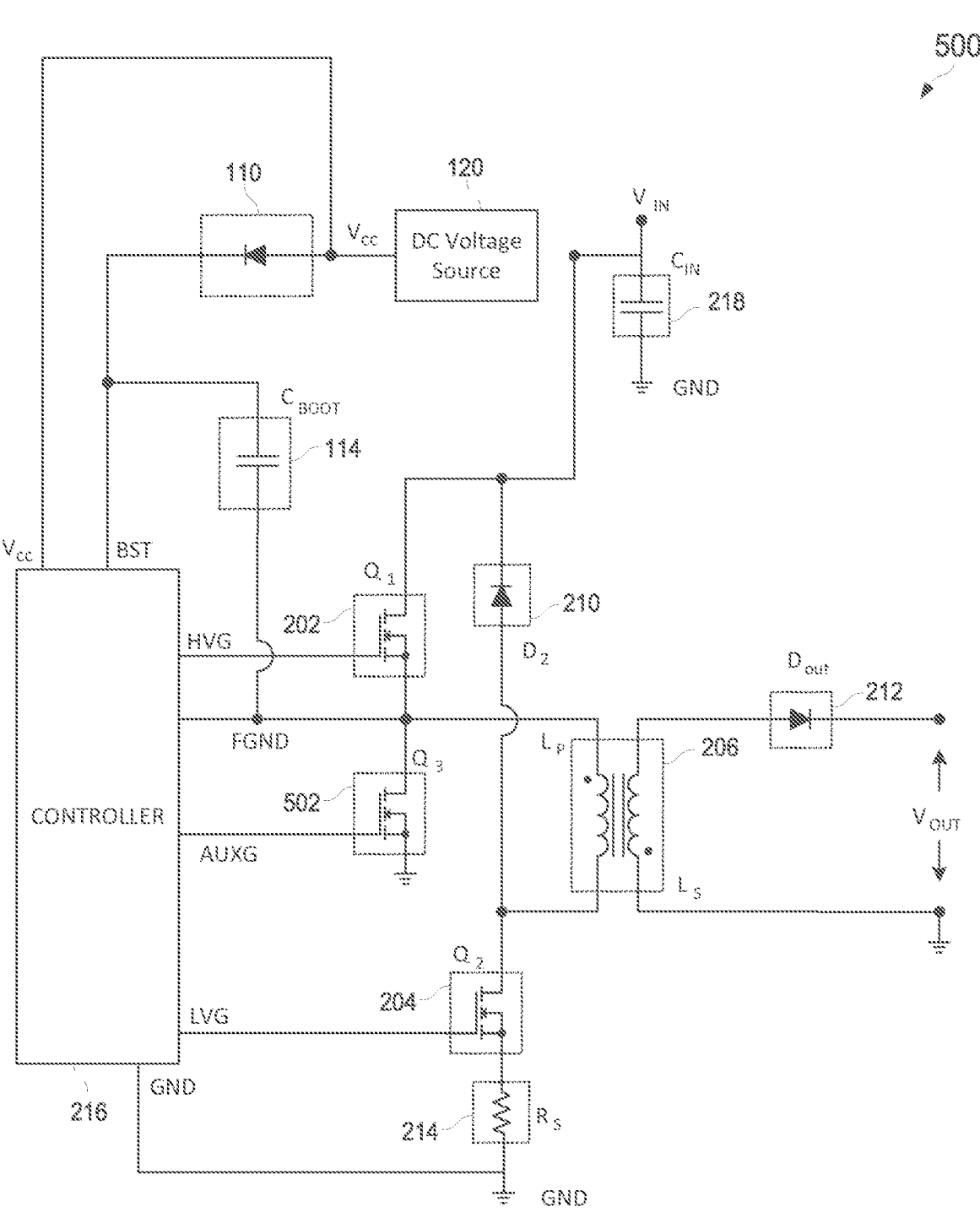
FIG. 5 is a schematic of an embodiment dual-switch flyback converter.

FIG. 5 illustrates a schematic of an embodiment dual-switch flyback converter 500. Dual-switch flyback converter 500 includes the high-side switch ($Q_1$) 202, the low-side switch ($Q_2$) 204, the transformer 206, an auxiliary switch ($Q_3$) 502, the second diode ($D_2$) 210, the output diode ($D_{OUT}$) 212, the sense resistor ($R_S$) 214, the control circuitry 216, the input capacitor ($C_{IN}$) 218, the bootstrap diode 110, the bootstrap capacitor ($C_{BOOT}$) 114, and the DC voltage source 120, which may (or may not) be arranged as shown. Dual-switch flyback converter 500 may include additional components not shown, such as gate drive circuitry for each of the high-side switch ($Q_1$) 202, the low-side switch ($Q_2$) 204, and the auxiliary switch ($Q_3$) 502.

In the dual-switch flyback converter 500, the first diode ($D_1$) 208 is replaced with the auxiliary switch ($Q_3$) 502. The high-side switch ($Q_1$) 202 and the auxiliary switch ($Q_3$) 502 form a half-bridge structure 504. The half-bridge structure 504 ensures that the bootstrap capacitor ($C_{BOOT}$) 114 is recharged.

The source terminal of the auxiliary switch ($Q_3$) 502 is coupled to the reference ground. The control terminal (AUXG) of the auxiliary switch ($Q_3$) 502 is coupled to the controller circuitry 216. The drain terminal of the auxiliary switch ($Q_3$) 502 is coupled to the floating ground (FGND) node. In embodiments, the auxiliary switch ($Q_3$) 502 is an n-channel MOSFET.

In embodiments, the controller circuitry 216 is configured to activate (i.e., turn ON) the auxiliary switch ($Q_3$) 502 for a short duration while the high-side switch ($Q_1$) 202 and the low-side switch ($Q_2$) 204 are turned OFF. In embodiments, during the duration where the auxiliary switch ($Q_3$) 502 is in the OFF state, the body diode of the auxiliary switch ($Q_3$) 502 acts as a recirculation diode similar to the first diode ($D_1$) in the dual-switch flyback converter 500.

Advantageously, this allows the bootstrap capacitor ($C_{BOOT}$) 114 to be recharged regardless of the operating conditions. Further, the solution does not require a drive transformer resulting in reduced component count and cost compared to the conventional solutions.

In embodiments, the control circuitry 216 is configured to activate and deactivate the auxiliary switch ($Q_3$) 502 based on circuit parameters (e.g., parasitic capacitances, reverse voltage ($V_R$), leakage inductance, etc.) and load conditions of the converter, since setting a fixed delay for the activation of the auxiliary switch ($Q_3$) 502 for all variations is not feasible.

In embodiments, the activation of the auxiliary switch ($Q_3$) 502 is immediately after the deactivation of the high-side switch ($Q_1$) 202 and the low-side switch ($Q_2$) 204. It should be appreciated, however, that the activation of the auxiliary switch ($Q_3$) 502 can occur at any time after the deactivation of the high-side switch ($Q_1$) 202 and the low-side switch ($Q_2$) 204.

Figure 6:
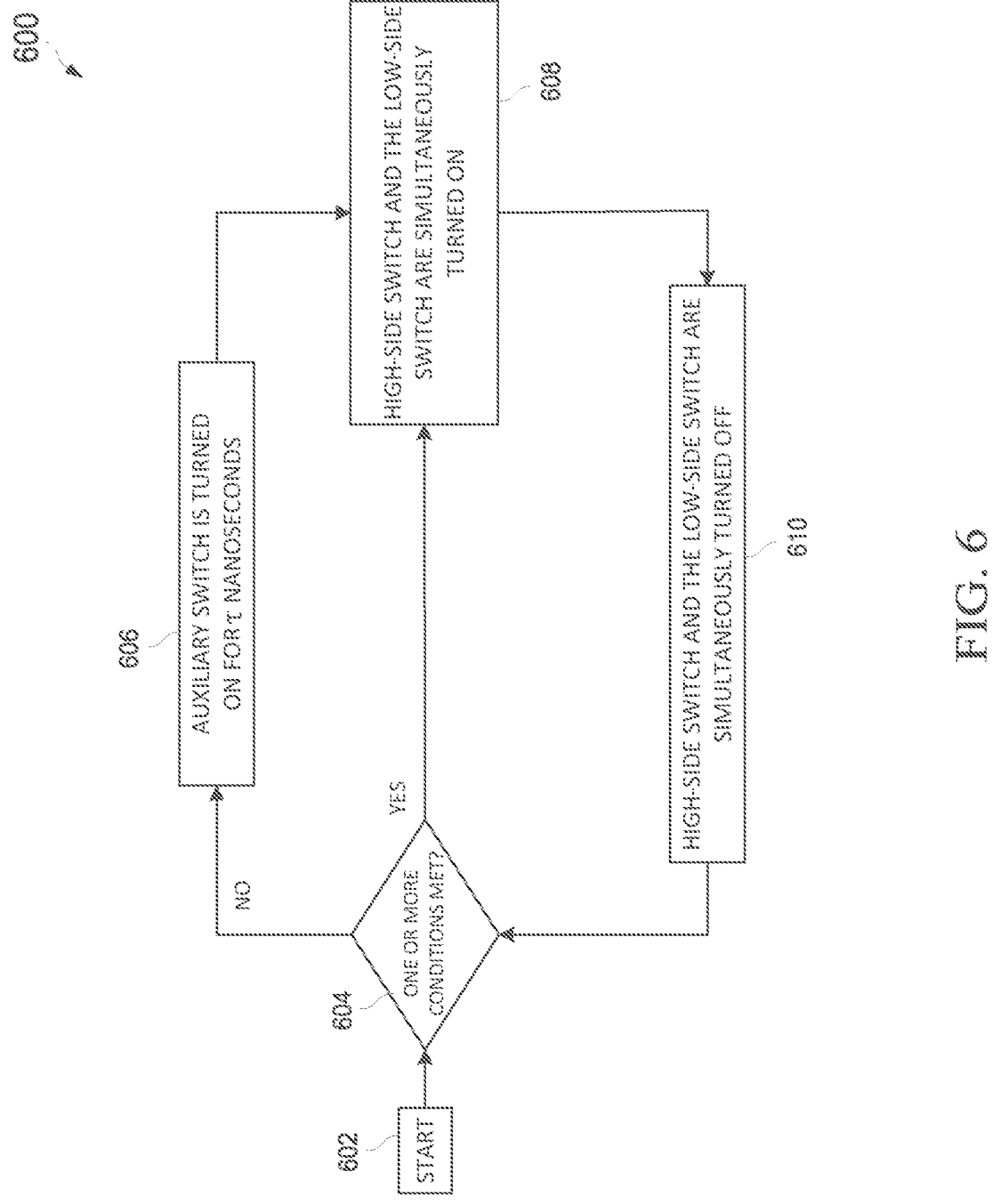
FIG. 6 is a flow chart of an embodiment method for operating the dual-switch flyback converter.

FIG. 6 illustrates a flow chart of an embodiment method 600 for operating the dual-switch flyback converter 500. It is noted that all steps outlined in the flow chart are not necessarily required and can be optional. Further, changes to the arrangement of the steps, removal of one or more steps and path connections, and addition of steps and path connections are similarly contemplated.

At step 602, an operation cycle of the dual-switch flyback converter 500 begins. At step 604, one or more conditions are checked. A first condition (Condition A) corresponds to monitoring the voltage across the bootstrap capacitor ($C_{BOOT}$) 114. A second condition (Condition B) corresponds to monitoring the voltage ($V_{FGND}$) at the floating ground (FGND) node.

When operating based on Condition A, in response to detecting that the voltage across the bootstrap capacitor ($C_{BOOT}$) 114 is greater than a first threshold voltage ($V_{TH1}$) in the cycle, the auxiliary switch ($Q_3$) 502 remains OFF for the operation cycle. This can be represented as: if $V_{BST} > V_{TH1} \rightarrow Q_3$ Remains OFF, where $V_{BST}$ is the voltage across the bootstrap capacitor.

Conversely, when operating based on Condition A, in response to detecting that the voltage across the bootstrap capacitor ($C_{BOOT}$) 114 is less than the first threshold voltage ($V_{TH1}$) in the cycle, the auxiliary switch ($Q_3$) 502 is turned ON for τ seconds in the operation cycle. This can be represented as: if $V_{BST} < V_{TH1} \rightarrow Q_3$ Turned ON. In embodiments, τ equals 200 ns.

When operating based on Condition B, in response to detecting that the voltage ($V_{FGND}$) at the floating ground (FGND) node, for $\tau_1$ seconds within a $\tau_2$ second period immediately after the high-side switch ($Q_1$) 202 and the low-side switch ($Q_2$) 204 are turned OFF, is greater than a second threshold (VTH2), the auxiliary switch ($Q_3$) 502 is turned ON for the operation cycle. This can be represented as: if $V_{FGND} > V_{TH1} \rightarrow Q_3$ Turned ON, where $V_{FGND}$ is the voltage at the floating ground (FGND) for $\tau_1$ seconds within the $\tau_2$ second period. In embodiments, $\tau_1$ equals 100 nanoseconds (ns). In embodiments, $\tau_2$ equals 300 ns.

Conversely, when operating based on Condition B, in response to detecting that the voltage ($V_{FGND}$) at the floating ground (FGND) node, for $\tau_1$ seconds within a $\tau_2$ second period immediately after the high-side switch ($Q_1$) 202 and the low-side switch ($Q_2$) 204 are turned OFF, is less than the second threshold (VTH2), the auxiliary switch ($Q_3$) 502 remains OFF for the operation cycle. This can be represented as: if $V_{FGND} < V_{TH1} \rightarrow Q_3$ Remains OFF.

In embodiments, the first threshold voltage ($V_{TH1}$) and the second threshold voltage ($V_{TH2}$) are pre-determined and stored in the memory of the host device coupled to the controller circuitry 216. In embodiments, the first threshold voltage ($V_{TH1}$) and the second threshold voltage ($V_{TH2}$) are determined using machine learning techniques based on load and component variation conditions. In embodiments, the first threshold voltage ($V_{TH1}$) is set to 8 Volts. In embodiments, the second threshold voltage ($V_{TH2}$) is set to 1 V.

In embodiments, the satisfaction of Condition A or Condition B is used to satisfy step 604. At step 606, in response to Condition A or Condition B NOT being met, the auxiliary switch ($Q_3$) 502 is turned ON for t seconds in the operation cycle. At step 608, in response to (i) Condition A or Condition B being met or (ii) after the auxiliary switch ($Q_3$) 502 is turned ON at step 606, the high-side switch ($Q_1$) 202 and the low-side switch ($Q_2$) 204 are simultaneously turned ON. In embodiments, the satisfaction of one of the conditions depends on the implementation used in the control IC. In embodiments, Condition A and Condition B are alternative conditions.

At step 610, high-side switch ($Q_1$) 202 and the low-side switch ($Q_2$) 204 are simultaneously deactivated. In embodiments, the high-side switch ($Q_1$) 202 is deactivated when the peak inductor current reaches a value programmed by a control loop. In embodiments, the control loop regulates the output voltage ($V_{OUT}$) by adjusting the duty cycle of the high-side switch ($Q_1$) 202 and the low-side switch ($Q_2$) 204. In embodiments, a current sensor is used to measure the inductor current in real-time, which is fed to the control loop. Once the inductor current reaches the predetermined peak value, as set by the control loop, the high-side switch ($Q_1$) 202 is turned off. This action terminates the energy storage phase in the windings of the primary side ($L_P$) and initiates the energy transfer to the windings of the secondary side ($L_S$). Steps 604 through 610 are repeated for the next cycle.

Figure 7:
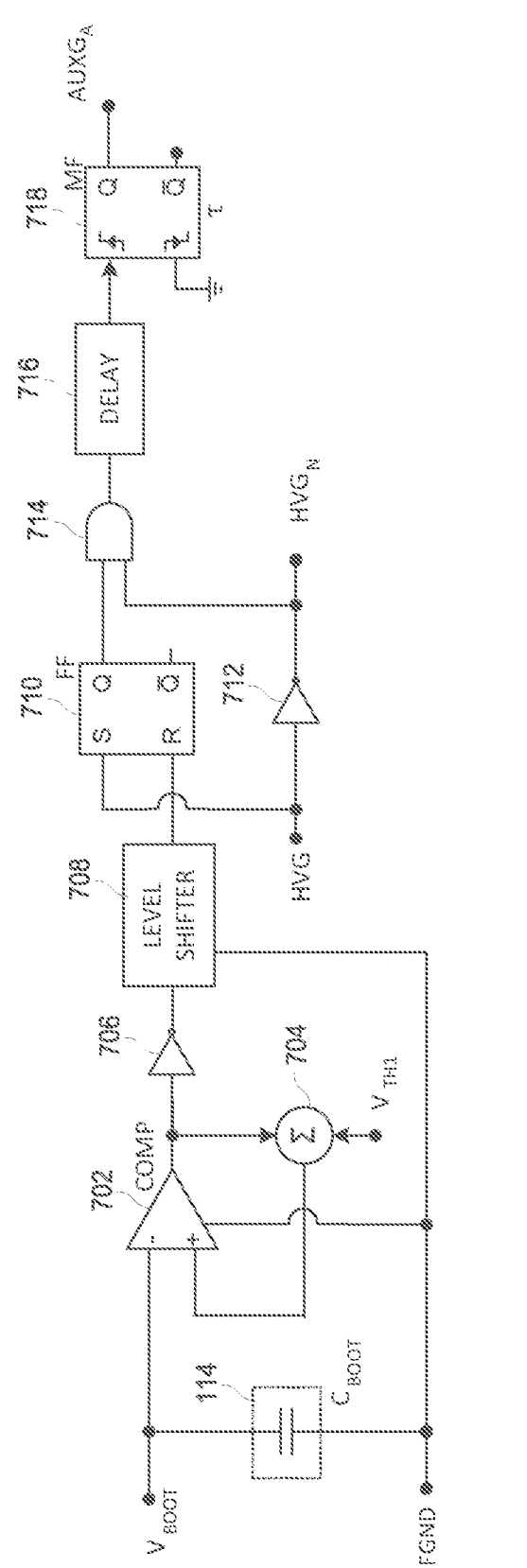
FIG. 7 is a schematic of an embodiment control logic circuit that can be implemented for Condition A of the method in FIG. 6 in the dual-switch flyback converter.

FIG. 7 illustrates a schematic of an embodiment control logic circuit 700 that can be implemented for Condition A of method 600 in the dual-switch flyback converter 500. control logic circuit 700 checks for Condition A, and provides a control signal ($AUXG_A$) to the control terminal of the auxiliary switch ($Q_3$) 502. In response to detecting that the voltage across the bootstrap capacitor ($C_{BOOT}$) 114 is greater than the first threshold voltage ($V_{TH1}$) in the cycle, the auxiliary switch ($Q_3$) 502 remains OFF for the operation cycle. In response to detecting that the voltage across the bootstrap capacitor ($C_{BOOT}$) 114 is less than the first threshold voltage ($V_{TH1}$) in the cycle, the auxiliary switch ($Q_3$) 502 is turned ON for τ seconds in the operation cycle.

The control logic circuit 700 includes a comparator (COMP) 702, an adder circuit 704, a first inverter 706, a level-shifter circuit 708, a flip-flop (FF) 710, a second inverter 712, an AND gate 714, a delay circuit 716, and a mono-flop (MF) 718, which may (or may not) be arranged as shown. The control logic circuit 700 may include additional components not shown, such as filter circuits. The input of the control logic circuit 700 is coupled to the terminals of the bootstrap capacitor ($C_{BOOT}$) 114.

The comparator (COMP) 702 is configured to effectively compare the voltage ($V_{BOOT}$) across the bootstrap capacitor ($C_{BOOT}$) 114 against the first threshold voltage ($V_{TH1}$). As noted in method 600, a first condition (Condition A) that can be checked to determine whether to turn ON the auxiliary switch ($Q_3$) 502 is based on the difference between the voltage across the bootstrap capacitor ($C_{BOOT}$) 114 and the first threshold voltage ($V_{TH1}$).

The comparator (COMP) 702 is configured with hysteresis-its past states influence its output due to the feedback connection via the adder circuit 704. Adder circuit 704 has a first input configured to receive the first threshold voltage ($V_{TH1}$) and a second input configured to receive the comparator output. The comparator (COMP) 702 is configured to receive the summed value of the first threshold voltage ($V_{TH1}$) and the comparator output at its non-inverting input, which is provided from the output of the adder circuit 704. The inverting input of the comparator (COMP) 702 is configured to receive the voltage ($V_{BOOT}$) across the bootstrap capacitor ($C_{BOOT}$) 114. The comparator (COMP) 702 is configured to generate an output signal fed to an input of the first inverter 706 based on comparing the signals at its input terminals. It should be noted that in embodiments, other techniques apart from an adder circuit can be used to implement hysteresis.

In embodiments, the comparator (COMP) 702 provides an output signal to the first inverter 706 based on the comparison of the voltage across the bootstrap capacitor ($C_{BOOT}$) 114 and the first threshold voltage ($V_{TH1}$). In response to the summed value of the first threshold voltage ($V_{TH1}$) and the comparator output being greater than the voltage across the bootstrap capacitor ($C_{BOOT}$) 114, the comparator (COMP) 702 will output a logic level high (e.g., '1'). In response to the summed value of the first threshold voltage ($V_{TH1}$) and the comparator output being less than the voltage across the bootstrap capacitor ($C_{BOOT}$) 114, the comparator (COMP) 702 will output a logic level low (e.g., '0'). The output of the comparator (COMP) 702 is inverted through the first inverter 706, and fed to level-shifter circuit 708.

In response to the voltage across the bootstrap capacitor ($C_{BOOT}$) 114 being greater than or equal to the summed value of the first threshold voltage ($V_{TH1}$) and the comparator output, the output of the first inverter 706 is set to a logic level high (e.g., '1'). In response to the voltage across the bootstrap capacitor ($C_{BOOT}$) 114 being less than the summed value of the first threshold voltage ($V_{TH1}$) and the comparator output, the output of the first inverter 706 is set to a logic level low (e.g., '0').

Level-shifter circuit 708 transfers the digital value at the output of the first inverter 706 from a first part of the control logic circuit 700 referred to as a floating ground to a second part of the control logic circuit 700 with a reference ground. Common methods to implement the level-shifter circuit 708 include opto-isolators (i.e., optocouplers), transformers, and cascaded structures. Thus, the level-shifter circuit 708 transfers the digital value at the output of the first inverter 706 to the Reset (R) input of the flip-flop (FF) 710.

In embodiments, the flip-flop (FF) 710 is a reset-dominant, level-sensitive, set-reset (SR) flip-flop. As the flip-flop (FF) 710 is reset-dominant, the Reset (R) input takes precedence over the Set (S) input. This means that if both Set (S) and Reset (S) inputs are at a high level, the flip-flop (FF) 710 will go to the "Reset" state, ignoring the Set (S) input. The high-side signal (HVG) is provided at the Set (S) input of the flip-flop (FF) 710. Thus, the flip-flop (FF) 710 is "Set" when the high-side switch ($Q_1$) 202 is activated.

Further, as the flip-flop (FF) 710 is level-sensitive, the flip-flop (FF) 710 reacts to the level of the input signals rather than their edge transitions. Thus, as long as the Set (S) input or the Reset (R) input remains at a particular logic level (high or low), the output will maintain its corresponding state. Accordingly, if the output of the first inverter 706 is set to a logic level high (e.g., '1'), the reset signal is asserted at the Reset (R) input of the flip-flop (FF) 710. Conversely, if the output of the first inverter 706 is set to a logic level low (e.g., '0'), the reset signal is NOT asserted at the Reset (R) input of the flip-flop (FF) 710.

The output (Q) of the flip-flop (FF) 710 is at a logic level low when the Reset (R) input is at a logic level high (i.e., bootstrap capacitor ($C_{BOOT}$) 114 exceeds the first threshold voltage ($V_{TH1}$)), regardless of whether the high-side switch ($Q_1$) 202 is activated or deactivated. This is because the Reset (R) input is dominant and will override the state of the Set (S) input and force the output (Q) to be low.

The output (Q) of the flip-flop (FF) 710 is at a logic level high when (i) the high-side switch ($Q_1$) 202 is activated and (ii) the Reset (R) input is at a logic level low (i.e., bootstrap capacitor ($C_{BOOT}$) 114 is less than the first threshold voltage ($V_{TH1}$)). This is because the Reset (R) input is low, and the Set (S) input influences the output (Q), setting it to a high state.

If the Set (S) and Reset (R) inputs are at a logic level low, corresponding to the high-side switch ($Q_1$) 202 being deactivated and the bootstrap capacitor ($C_{BOOT}$) 114 being less than the first threshold voltage ($V_{TH1}$), the output (Q) will maintain its last value (either high or low).

A first input of the AND gate 714 is coupled to the output (Q) of the flip-flop (FF) 710. The second inverter 712 reverses the logic signal of the high-side signal (HVG) to generate an inverted high-side signal ($HVG_N$), which is at a logic level high when the high-side switch ($Q_1$) 202 is deactivated and at a logic level low when the high-side switch ($Q_1$) 202 is activated.

Thus, the output of the AND gate 714 provides a positive edge signal to the input of the delay circuit 716 when (i) the high-side switch ($Q_1$) 202 is deactivated and (ii) the output (Q) of the flip-flop (FF) 710 is at a logic level high, indicating that the bootstrap capacitor ($C_{BOOT}$) 114 is less than the first threshold voltage ($V_{TH1}$).

Delay circuit 716 is configured to provide a fixed or programmable delay before the signal at the output of the AND gate 714 is provided to the input terminal of the mono-flop (MF) 718. In embodiments, the delay circuit 716 is configured to provide a delay equal to about 100 ns.

The mono-flop (MF) 718 is configured to switch from a stable state to an unstable state for a predetermined period in response to being triggered and then automatically returns to the stable state. In embodiments, the mono-flop (MF) 718 is arranged as a positive edge-triggered mono-flop.

In response to the bootstrap capacitor ($C_{BOOT}$) 114 being less than the first threshold voltage ($V_{TH1}$), the delayed, positive edge signal (signal transitioning from a logic level low to a logic level high) from the AND gate 714 triggers the mono-flop (MF) 718, resulting in the change of state of the mono-flop (MF) 718 and the generating of a control signal ($AUXG_A$) for $\tau$ seconds at its output (Q), activating the auxiliary switch ($Q_3$) 502.

Figure 8:
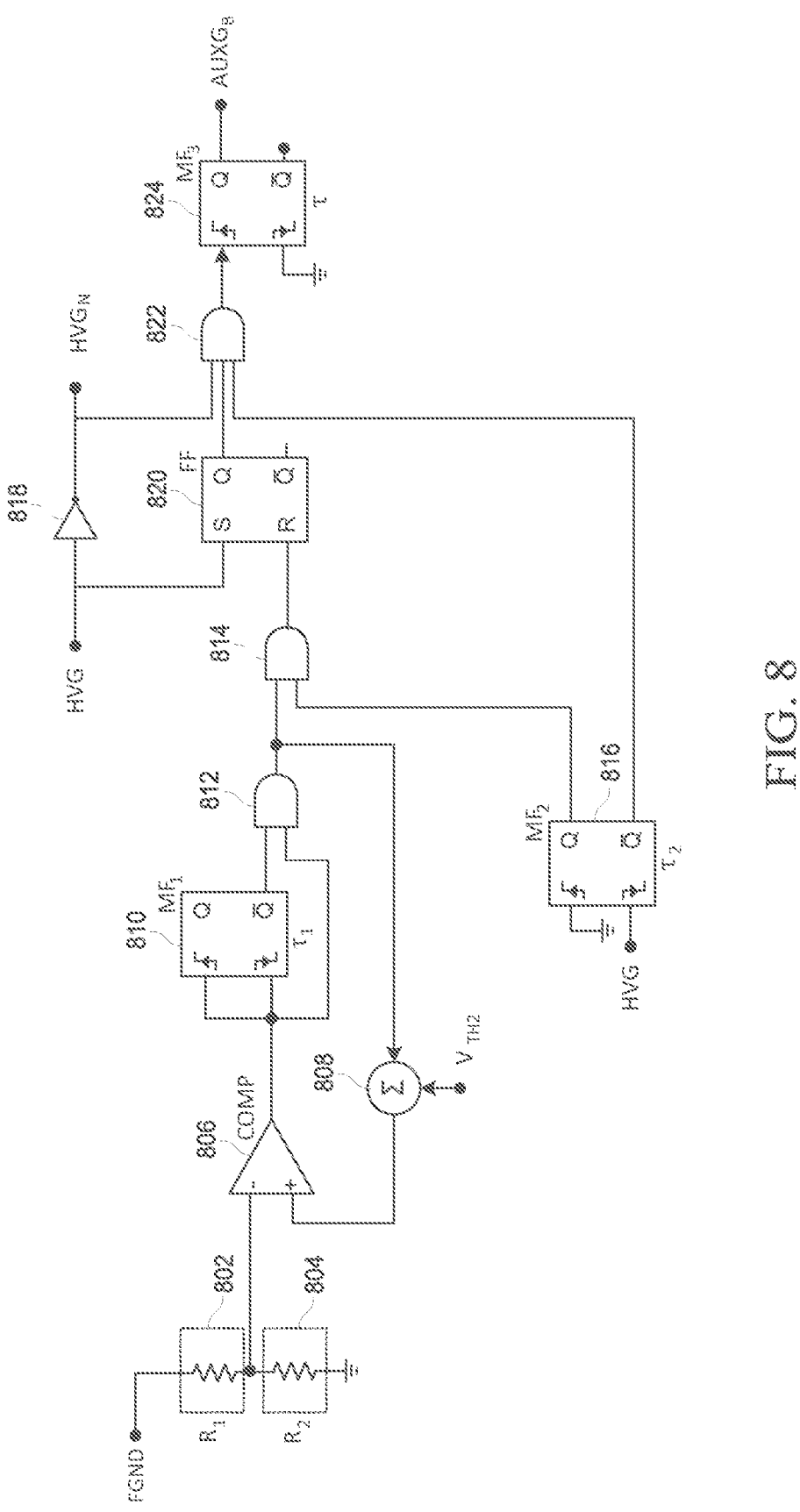
FIG. 8 is a schematic of an embodiment control logic circuit that can be implemented for Condition B of the method in FIG. 6 in the dual-switch flyback converter.

FIG. 8 illustrates a schematic of an embodiment control logic circuit 800 that can be implemented for Condition B of method 600 in the dual-switch flyback converter 500. control logic circuit 800 checks for Condition B, and provides a control signal ($AUXG_B$) to the control terminal of the auxiliary switch ($Q_3$) 502. In response to detecting that the voltage ($V_{FGND}$) at the floating ground (FGND) node, for $\tau_1$ seconds within a $\tau_2$ second period immediately after the high-side switch ($Q_1$) 202 and the low-side switch ($Q_2$) 204 are turned OFF, is greater than a second threshold (VTH2), the auxiliary switch ($Q_3$) 502 is turned ON for the operation cycle. In response to detecting that the voltage ($V_{FGND}$) at the floating ground (FGND) node, for $\tau_1$ seconds within the $\tau_2$ second period immediately after the high-side switch ($Q_1$) 202 and the low-side switch ($Q_2$) 204 are turned OFF, is less than the second threshold (VTH2), the auxiliary switch ($Q_3$) 502 remains OFF for the operation cycle.

The control logic circuit 800 includes a first resistor (R1) 802, a second resistor (R2) 804, a comparator (COMP) 806, an adder circuit 808, a first mono-flop (MF$_1$) 810, a first AND gate 812, a second AND gate 814, a second mono-flop (MF$_2$) 816, an inverter 818, a flip-flop (FF) 820, a third AND gate 822, and a third mono-flop (MF$_3$) 824, which may (or may not) be arranged as shown. The control logic circuit 800 may include additional components not shown, such as filter circuits. The input of the control logic circuit 800 is coupled to the floating ground (FGND) node.

The comparator (COMP) 806 is configured to effectively compare voltage ($V_{FGND}$) at the floating ground (FGND) node through the voltage divider (i.e., voltage divider comprising the first resistor (R1) 802 and the second resistor (R2) 804) against the second threshold voltage (VTH$_2$). As noted in method 600, a second condition (Condition B) that can be checked to determine whether to turn ON the auxiliary switch ($Q_3$) 502 is based on the voltage ($V_{FGND}$) at the floating ground (FGND) node being greater than the second threshold voltage (VTH$_2$) for $\tau_1$ seconds within the $\tau_2$ second period immediately after the high-side switch ($Q_1$) 202 and the low-side switch ($Q_2$) 204 are turned OFF.

The comparator (COMP) 806 is configured with hysteresis—provided from the output of the first AND gate 812. The comparator (COMP) 806 has an inverting input (–) configured to receive the voltage ($V_{FGND}$) at the floating ground (FGND) node. The non-inverting input of the comparator (COMP) 806 is coupled to the output of the adder circuit 808.

The adder circuit 808 has a first input configured to receive the second threshold voltage (VTH$_2$). A second input of the adder circuit 808 is configured to receive the output of the first AND gate 812. The comparator (COMP) 806 is configured to generate an output signal fed to the first mono-flop (MF1) 810 and a first input of the first AND gate 812. The second input of the first AND gate 812 is coupled to the Not-Q ($\overline{Q}$) output of the first mono-flop (MF1) 810.

The first mono-flop (MF1) 810 is configured to switch from a stable state to an unstable state for $\tau_1$ seconds in response to being triggered and then automatically returns to the stable state. In embodiments, the first mono-flop (MF1) 810 is arranged as an edge-triggered (positive or negative) mono-flop.

In response to the output of the comparator (COMP) 806 transitioning from a logic level high to a logic level low or from a logic level low to a logic level high, the first mono-flop (MF1) 810 is triggered, resulting in the change of state and the generating of a set signal to the second input of the first AND gate 812 for a duration of $\tau_1$ seconds through the Not-Q ($\overline{Q}$) output of the first mono-flop (MF1) 810.

In response to the output of the comparator (COMP) 806 and the Not-Q ($\overline{Q}$) output of the first mono-flop (MF1) 810 being at a logic level high, the first AND gate 812 provides a logic level high signal to a first input of the second AND gate 814. A second input of the second AND gate 814 is provided by the output (Q) of the second mono-flop (MF2) 816.

The second mono-flop (MF2) 816 is configured to switch from a stable state to an unstable state for $\tau_2$ seconds in response to being triggered and then automatically returns to the stable state. In embodiments, the second mono-flop (MF2) 816 is arranged as a negative edge-triggered mono-flop. In particular, the second mono-flop (MF2) 816 is triggered in response to the high-side signal (HVG) transitioning from a logic level high to a logic level low (i.e., high-side switch (Q$_1$) 202 being deactivated), which is provided as a logic high signal to the input of the second AND gate 814.

In response to the high-side signal (HVG) transitioning from a logic level high to a logic level low and the output of the first AND gate 812 being at a logic level high, the second AND gate 814 provides a reset signal to the Reset (R) input of the flip-flop (FF) 820. In embodiments, the flip-flop (FF) 820 is an edge-sensitive flip-flop. The Set (S) input of the flip-flop (FF) 820 is set when the high-side signal (HVG) is at a logic level high.

Thus, when the high-side switch (Q$_1$) 202 is deactivated and the first AND gate 812 is at a logic level high, the second AND gate resets the flip-flop (FF) 820 and provides a logic level high to the first input of the third AND gate 822. A second input of the third AND gate 822 is coupled to the output of the inverter 818. The inverter 818 inverts the high-side signal (HVG) to generate an inverted high-side signal (HVG$_N$). Thus, when the high-side switch (Q$_1$) 202 is deactivated, the inverted high-side signal (HVG$_N$) is at a logic level high. The third input of the third AND gate 822 is coupled to the Not-Q ($\overline{Q}$) output of the second mono-flop (MF2) 816.

The third mono-flop (MF$_3$) 824 is configured to switch from a stable state to an unstable state for a predetermined period in response to being triggered and then automatically returns to the stable state. In embodiments, the third mono-flop (MF$_3$) 824 is arranged as a positive edge-triggered mono-flop. In response to the three inputs to the third AND gate 822 transitioning to a logic level high, a positive edge trigger is provided to the third mono-flop (MF3) 824. The positive edge signal (signal transitioning from a logic level low to a logic level high) from the third AND gate 822 triggers the third mono-flop (MF3) 824, resulting in the change of state of the third mono-flop (MF$_3$) 824 and the generating of a control signal (AUXG$_B$) for t seconds at its output (Q), activating the auxiliary switch (Q$_3$) 502.

Figure 9:
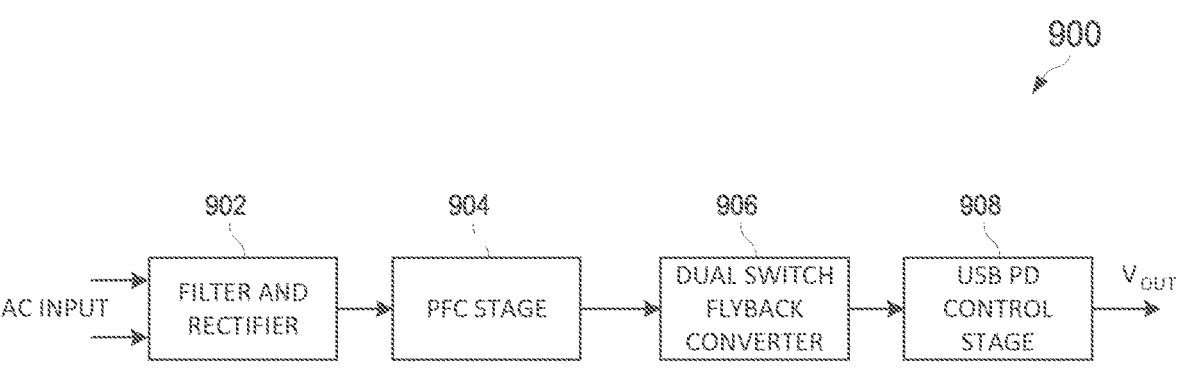
FIG. 9 is a block diagram of an embodiment system.

FIG. 9 illustrates a block diagram of an embodiment system 900. In embodiments, system 900 includes a filter and rectifier circuit 902, an optional Power Factor Correction (PFC) stage circuit 904, a dual-switch flyback converter 906, and a USB PD Control stage circuit 908, which may (or may not) be arranged as shown. System 900 may include additional components not shown. In embodiments, system 900 is a high-density USB-C charger used to charge, for example, a mobile device or the like.

The filter and rectifier circuit 902 is configured to receive the alternating current (AC) input from a power source. The filter and rectifier circuit 902 filters out noise and unwanted frequencies from the AC input and converts it into direct current (DC).

The PFC stage circuit 904 ensures that the voltage and current waveforms are aligned to maximize the power transfer efficiency. The PFC stage circuit 904 is generally required for input power levels greater than 75 watts (W).

The dual-switch flyback converter 906 converts the DC output from the PFC stage circuit 904 to another DC level suitable for the USB PD Control stage circuit 908. In embodiments, the dual-switch flyback converter 906 is implemented as the dual-switch flyback converter 500 with the control logic circuit 700, 800 and operated using method 600.

The USB PD Control stage circuit 908 regulates and controls the power via the output voltage (V$_{OUT}$) delivered to a USB-C device.

A first aspect relates to a converter that includes a bootstrap capacitor, a high-side switch, a low-side switch, an auxiliary switch, and a controller. The bootstrap capacitor has a first terminal coupled to a floating ground node. The high-side switch has a source terminal coupled to the bootstrap capacitor through the floating ground node. The auxiliary switch has a drain terminal coupled to the bootstrap capacitor through the floating ground node. The controller is configured to provide a first control signal to a control terminal of the high-side switch, provide a second control signal to a control terminal of the low-side switch, and provide a third control signal to a control terminal of the auxiliary switch. The third control signal to activate the auxiliary switch for a current cycle is based on a condition associated with the converter after the first control signal and the second control signal deactivate the high-side switch and the low-side switch respectively.

In a first implementation form of the converter according to the first aspect as such, the converter further includes a control logic circuit configured to monitor a voltage across the bootstrap capacitor.

In a second implementation form of the converter according to the first aspect as such or any preceding implementation form of the first aspect, the third control signal is set to activate the auxiliary switch for the current cycle in response to detecting, by the control logic circuit, that the voltage across the bootstrap capacitor is less than a threshold.

In a third implementation form of the converter according to the first aspect as such or any preceding implementation form of the first aspect, the third control signal is set to keep the auxiliary switch deactivated for the current cycle in response to detecting, by the control logic circuit, that the voltage across the bootstrap capacitor is greater than a threshold.

In a fourth implementation form of the converter according to the first aspect as such or any preceding implementation form of the first aspect, the converter further includes a control logic circuit configured to monitor a voltage at the floating ground node for $\tau_1$ seconds within a $\tau_2$ second period immediately after the high-side switch is turned OFF.

In a fifth implementation form of the converter according to the first aspect as such or any preceding implementation form of the first aspect, the third control signal is set to activate the auxiliary switch for the current cycle in response to detecting, by the control logic circuit, that the voltage at the floating ground node for the $\tau_1$ seconds within the $\tau_2$ second period immediately after the high-side switch is turned OFF is greater than a threshold.

In a sixth implementation form of the converter according to the first aspect as such or any preceding implementation form of the first aspect, the third control signal is set to keep the auxiliary switch deactivated for the current cycle in response to detecting, by the control logic circuit, that the voltage at the floating ground node for the $\tau_1$ seconds within the $\tau_2$ second period immediately after the high-side switch is turned OFF is less than a threshold.

A second aspect relates to a method of operating a converter. The method includes generating, by a controller, a first control signal to a control terminal of a high-side switch of the converter, the high-side switch having a source terminal coupled to a bootstrap capacitor through a floating ground node; generating, by the controller, a second control signal to a control terminal of a low-side switch of the converter; and determining, by the controller, whether to activate an auxiliary switch for a current cycle using a third control signal, the auxiliary switch having a drain terminal coupled to the bootstrap capacitor through the floating ground node. The determining is based on a condition associated with the converter after the first control signal and the second control signal deactivate the high-side switch and the low-side switch respectively.

In a first implementation form of the method according to the second aspect as such, the method further includes monitoring, by a control logic circuit, a voltage across the bootstrap capacitor.

In a second implementation form of the method according to the second aspect as such or any preceding implementation form of the second aspect, the third control signal is set to activate the auxiliary switch for the current cycle in response to detecting, by the control logic circuit, that the voltage across the bootstrap capacitor is less than a threshold.

In a third implementation form of the method according to the second aspect as such or any preceding implementation form of the second aspect, the third control signal is set to keep the auxiliary switch deactivated for the current cycle in response to detecting, by the control logic circuit, that the voltage across the bootstrap capacitor is greater than the threshold.

In a fourth implementation form of the method according to the second aspect as such or any preceding implementation form of the second aspect, the method further includes monitoring, by a control logic circuit, a voltage at the floating ground node for $\tau_1$ seconds within a $\tau_2$ second period immediately after the high-side switch is turned OFF.

In a fifth implementation form of the method according to the second aspect as such or any preceding implementation form of the second aspect, the third control signal is set to activate the auxiliary switch for the current cycle in response to detecting, by the control logic circuit, that the voltage at the floating ground node for the $\tau_2$ second period immediately after the high-side switch is turned OFF is greater than a threshold.

In a sixth implementation form of the method according to the second aspect as such or any preceding implementation form of the second aspect, the third control signal is set to keep the auxiliary switch deactivated for the current cycle in response to detecting, by the control logic circuit, that the voltage at the floating ground node for the $\tau_1$ seconds within the $\tau_2$ second period immediately after the high-side switch is turned OFF is less than a threshold.

A third aspect relates to a device with a converter. The converter includes a bootstrap capacitor, a high-side switch, a low-side switch, an auxiliary switch, and a controller. The bootstrap capacitor has a first terminal coupled to a floating ground node. The high-side switch has a source terminal coupled to the bootstrap capacitor through the floating ground node. The auxiliary switch has a drain terminal coupled to the bootstrap capacitor through the floating ground node. The controller is configured to provide a first control signal to a control terminal of the high-side switch, provide a second control signal to a control terminal of the low-side switch, and provide a third control signal to a control terminal of the auxiliary switch. The third control signal to activate the auxiliary switch for a current cycle is based on a condition associated with the converter after the first control signal and the second control signal deactivate the high-side switch and the low-side switch respectively.

In a first implementation form of the device according to the third aspect as such, the converter further includes a control logic circuit configured to monitor a voltage across the bootstrap capacitor.

In a second implementation form of the device according to the third aspect as such or any preceding implementation form of the third aspect, the third control signal is set to activate the auxiliary switch for the current cycle in response to detecting, by the control logic circuit, that the voltage across the bootstrap capacitor is less than a threshold. The third control signal is set to keep the auxiliary switch deactivated for the current cycle in response to detecting, by the control logic circuit, that the voltage across the bootstrap capacitor is greater than the threshold.

In a third implementation form of the device according to the third aspect as such or any preceding implementation form of the third aspect, the converter further includes a control logic circuit configured to monitor a voltage at the floating ground node for $\tau_1$ seconds within a $\tau_2$ second period immediately after the high-side switch is turned OFF.

In a fourth implementation form of the device according to the third aspect as such or any preceding implementation form of the third aspect, the third control signal is set to activate the auxiliary switch for the current cycle in response to detecting, by the control logic circuit, that the voltage at the floating ground node for the $\tau_1$ seconds within the $\tau_2$ second period immediately after the high-side switch is turned OFF is greater than a threshold.

In a fifth implementation form of the device according to the third aspect as such or any preceding implementation form of the third aspect, the third control signal is set to keep the auxiliary switch deactivated for the current cycle in response to detecting, by the control logic circuit, that the voltage at the floating ground node for the $\tau_1$ seconds within the $\tau_2$ second period immediately after the high-side switch is turned OFF is less than the threshold.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A converter, comprising:
a transformer having a primary side and a secondary side;
a bootstrap capacitor having a first terminal coupled to a floating ground node;
a high-side switch having a source terminal coupled to the bootstrap capacitor through the floating ground node and a drain terminal coupled to the primary side of the transformer;
a low-side switch having a source terminal coupled to ground and a drain terminal coupled to the primary side of the transformer;
an auxiliary switch having a drain terminal coupled to the bootstrap capacitor through the floating ground node; and
a controller configured to:
provide a first control signal to a control terminal of the high-side switch,
provide a second control signal to a control terminal of the low-side switch, and
provide a third control signal to a control terminal of the auxiliary switch, wherein the third control signal activates the auxiliary switch for a current cycle based on a condition associated with the converter after the first control signal and the second control signal deactivate the high-side switch and the low-side switch, respectively.

2. The converter of claim 1, further comprising a control logic circuit configured to monitor a voltage across the bootstrap capacitor.

3. The converter of claim 2, wherein the third control signal is set to activate the auxiliary switch for the current cycle in response to detecting, by the control logic circuit, that the voltage across the bootstrap capacitor is less than a threshold.

4. The converter of claim 2, wherein the third control signal is set to keep the auxiliary switch deactivated for the current cycle in response to detecting, by the control logic circuit, that the voltage across the bootstrap capacitor is greater than a threshold.

5. The converter of claim 1, further comprising a control logic circuit configured to monitor a voltage at the floating ground node for a duration within a period immediately after the high-side switch is turned OFF.

6. The converter of claim 5, wherein the third control signal is set to activate the auxiliary switch for the current cycle in response to detecting, by the control logic circuit, that the voltage at the floating ground node for the duration within the period immediately after the high-side switch is turned OFF is greater than a threshold.

7. The converter of claim 5, wherein the third control signal is set to keep the auxiliary switch deactivated for the current cycle in response to detecting, by the control logic circuit, that the voltage at the floating ground node for the duration within the period immediately after the high-side switch is turned OFF is less than a threshold.

8. A method of operating a converter, the method comprising:
generating, by a controller, a first control signal to a control terminal of a high-side switch of the converter, the high-side switch having a source terminal coupled to a bootstrap capacitor through a floating ground node and a drain terminal coupled to a primary side of a transformer;
generating, by the controller, a second control signal to a control terminal of a low-side switch of the converter, the low-side switch having a source terminal coupled to ground and a drain terminal coupled to the primary side of the transformer; and
determining, by the controller, whether to activate an auxiliary switch for a current cycle using a third control signal, the auxiliary switch having a drain terminal coupled to the bootstrap capacitor through the floating ground node, wherein the determining is based on a condition associated with the converter after the first control signal and the second control signal deactivate the high-side switch and the low-side switch, respectively.

9. The method of claim 8, further comprising monitoring, by a control logic circuit, a voltage across the bootstrap capacitor.

10. The method of claim 9, wherein the third control signal is set to activate the auxiliary switch for the current cycle in response to detecting, by the control logic circuit, that the voltage across the bootstrap capacitor is less than a threshold.

11. The method of claim 10, wherein the third control signal is set to keep the auxiliary switch deactivated for the current cycle in response to detecting, by the control logic circuit, that the voltage across the bootstrap capacitor is greater than the threshold.

12. The method of claim 8, further comprising monitoring, by a control logic circuit, a voltage at the floating ground node for a duration within a period immediately after the high-side switch is turned OFF.

13. The method of claim 12, wherein the third control signal is set to activate the auxiliary switch for the current cycle in response to detecting, by the control logic circuit, that the voltage at the floating ground node for the duration within the period immediately after the high-side switch is turned OFF is greater than a threshold.

14. The method of claim 12, wherein the third control signal is set to keep the auxiliary switch deactivated for the current cycle in response to detecting, by the control logic circuit, that the voltage at the floating ground node for the duration within the period immediately after the high-side switch is turned OFF is less than a threshold.

15. A device comprising a converter, the converter comprising:

a transformer having a primary side and a secondary side;

a bootstrap capacitor having a first terminal coupled to a floating ground node;

a high-side switch having a source terminal coupled to the bootstrap capacitor through the floating ground node and a drain terminal coupled to the primary side of the transformer;

a low-side switch having a source terminal coupled to ground and a drain terminal coupled to the primary side of the transformer;

an auxiliary switch having a drain terminal coupled to the bootstrap capacitor through the floating ground node; and a controller configured to:

provide a first control signal to a control terminal of the high-side switch, provide a second control signal to a control terminal of the low-side switch, and provide a third control signal to a control terminal of the auxiliary switch, wherein the third control signal activates the auxiliary switch for a current cycle based on a condition associated with the converter after the first control signal and the second control signal deactivate the high-side switch and the low-side switch, respectively.

16. The device of claim 15, wherein the converter further comprises a control logic circuit configured to monitor a voltage across the bootstrap capacitor.

17. The device of claim 16, wherein the third control signal is set to activate the auxiliary switch for the current cycle in response to detecting, by the control logic circuit, that the voltage across the bootstrap capacitor is less than a threshold, and wherein the third control signal is set to keep the auxiliary switch deactivated for the current cycle in response to detecting, by the control logic circuit, that the voltage across the bootstrap capacitor is greater than the threshold.

18. The device of claim 15, wherein the converter further comprises a control logic circuit configured to monitor a voltage at the floating ground node for a duration within a period immediately after the high-side switch is turned OFF.

19. The device of claim 18, wherein the third control signal is set to activate the auxiliary switch for the current cycle in response to detecting, by the control logic circuit, that the voltage at the floating ground node for the duration within the period immediately after the high-side switch is turned OFF is greater than a threshold.

20. The device of claim 19, wherein the third control signal is set to keep the auxiliary switch deactivated for the current cycle in response to detecting, by the control logic circuit, that the voltage at the floating ground node for the duration within the period immediately after the high-side switch is turned OFF is less than the threshold.

* * * * *